United States Patent
LeFevre et al.

(10) Patent No.: US 10,046,512 B2
(45) Date of Patent: Aug. 14, 2018

(54) ELECTRO-PHOTOGRAPHIC 3-D PRINTING USING DISSOLVABLE PAPER

(71) Applicant: Xerox Corporation, Norwalk, CT (US)

(72) Inventors: Jason M. LeFevre, Penfield, NY (US); Paul J. McConville, Webster, NY (US); Chu-heng Liu, Penfield, NY (US); James A. Winters, Alfred Station, NY (US); Erwin Ruiz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 224 days.

(21) Appl. No.: 15/098,655

(22) Filed: Apr. 14, 2016

(65) Prior Publication Data

US 2017/0297266 A1 Oct. 19, 2017

(51) Int. Cl.
*B29C 65/02* (2006.01)
*B29C 67/00* (2017.01)
*G03G 15/00* (2006.01)
*B29C 64/141* (2017.01)
*B29C 64/223* (2017.01)
*B33Y 10/00* (2015.01)
(Continued)

(52) U.S. Cl.
CPC ............ *B29C 65/02* (2013.01); *B29C 64/141* (2017.08); *B29C 64/223* (2017.08); *B29C 67/0074* (2013.01); *B29C 67/0092* (2013.01); *G03G 15/00* (2013.01); *B29C 64/188* (2017.08); *B29C 67/0055* (2013.01); *B29K 2105/0058* (2013.01); *B29K 2105/251* (2013.01); *B29K 2105/256* (2013.01); *B29K 2995/001* (2013.01); *B29K 2995/0059* (2013.01); *B33Y 10/00* (2014.12); *B33Y 30/00* (2014.12); *B33Y 40/00* (2014.12)

(58) Field of Classification Search
CPC ......... B33Y 10/00; B33Y 40/00; B33Y 30/00; B29C 64/223; B29C 67/0074; B29C 67/0055; B29C 65/02; B29C 67/0092; B29C 64/141; B29C 64/188; B29K 2995/001; B29K 2105/256; B29K 2105/251; B29K 2105/0058; B29K 2995/0059; G03G 15/00
See application file for complete search history.

(56) References Cited

U.S. PATENT DOCUMENTS 6,376,148 B1 * 4/2002 Liu ..................... B22F 3/008
                                                    156/273.1
7,250,238 B2 7/2007 Fromm et al.
(Continued)

*Primary Examiner* — Vishal I Patel
(74) *Attorney, Agent, or Firm* — Gibb & Riley, LLC

(57) ABSTRACT

In 3-D printing a platen moves toward an intermediate transfer belt (ITB) to have a sheet positioned on the platen contact the ITB to electrostatically transfer a layer of different materials to the sheet, and then the platen moves to a heater to join the layer to the sheet. This processing is repeated to have the sheet repeatedly contact the ITB (with intervening heating at the heater) to successively form layers of the materials on the sheet. The sheet having the layers thereon moves to a rinsing station, where a liquid is applied to dissolve the sheet and leave a freestanding stack of the layers. The freestanding stack is fed to a platform to successively form a 3-D structure of freestanding stacks of the layers. Light and/or heat are applied to the 3-D structure to bond the freestanding stacks to one another on the platform.

10 Claims, 23 Drawing Sheets

(51) Int. Cl.
*B33Y 30/00* (2015.01)
*B33Y 40/00* (2015.01)
*B29K 105/00* (2006.01)
*B29C 64/188* (2017.01)

(56) References Cited

U.S. PATENT DOCUMENTS

| | | |
|---|---|---|
| 7,261,542 B2 | 8/2007 | Hickerson et al. |
| 7,270,408 B2 | 9/2007 | Odell et al. |
| 7,851,549 B2 | 12/2010 | Sacripante et al. |
| 8,470,231 B1 | 6/2013 | Dikovsky et al. |
| 8,488,994 B2 | 7/2013 | Hanson et al. |
| 8,668,859 B2 | 3/2014 | Pettis |
| 8,879,957 B2 | 11/2014 | Hanson et al. |
| 9,193,110 B2 | 11/2015 | Pridoehl et al. |
| 2012/0276233 A1 | 11/2012 | Napadensky |
| 2013/0186558 A1* | 7/2013 | Comb ................ B29C 67/0051 156/277 |
| 2014/0134334 A1 | 5/2014 | Pridoehl et al. |
| 2014/0288699 A1 | 9/2014 | Williams et al. |
| 2015/0021830 A1 | 1/2015 | Yerazunis et al. |
| 2015/0142159 A1 | 5/2015 | Chang |
| 2015/0145174 A1 | 5/2015 | Comb |

* cited by examiner

ELECTRO-PHOTOGRAPHIC 3-D PRINTING USING DISSOLVABLE PAPER

BACKGROUND

Systems and methods herein generally relate to three-dimensional (3-D) printing processes that use electrostatic printing processes.

Three-dimensional printing can produce objects using, for example, ink-jet or electrostatic printers. In one exemplary three-stage process, a pulverulent material is printed in thin layers, a UV-curable liquid is printed on the pulverulent material, and finally each layer is hardened using a UV light source. These steps are repeated layer-by-layer. Support materials generally comprise acid-, base- or water-soluble polymers, which can be selectively rinsed from the build material after 3-D printing is complete.

The electrostatic (electro-photographic) process is a well-known means of generating two-dimensional digital images, which transfer materials onto an intermediate surface (such as a photoreceptor belt or drum). Advancements in the way an electro-photographic image is transferred can leverage the speed, efficiency and digital nature of printing systems.

SUMMARY

Exemplary three-dimensional (3-D) printers include, among other components, an intermediate transfer belt (ITB), a first photoreceptor positioned to electrostatically transfer a first material to the ITB, and a second photoreceptor positioned to electrostatically transfer a second material to a location of the ITB where the first material is located on the ITB. The second material dissolves in different solvents relative to solvents that dissolve the first material.

Also, a platen moves relative to the ITB, and a sheet feeder is positioned to feed sheets of media to the platen. The platen moves toward the ITB to have a sheet of the media positioned on the platen repeatedly contact the ITB. The ITB electrostatically transfers a layer of the first material and the second material to the sheet each time the platen contacts the sheet with the ITB to successively form layers of the first material and the second material on the sheet. The layer of the first material and the second material is on a discrete area of the ITB and is in a pattern.

Also, a heater is adjacent the platen. The platen moves to the heater after each time the ITB transfers each of the layers to the sheet to independently heat each of the layers and successively join each the layer to the sheet and to any previously transferred layers on the platen. In addition, a rinsing station is positioned to receive, from the platen, the sheet having the transferred layers thereon. The rinsing station applies a liquid to dissolve the sheet and leave a freestanding stack of the layers. The liquid only dissolves the sheet, and does not affect the first material or the second material. The rinsing station comprises a mesh belt and jets positioned to spray the liquid through the mesh belt.

A platform is thus positioned to receive, from the rinsing station, the freestanding stack to successively form a 3-D structure of freestanding stacks of the layers. Also, a bonding station is positioned to apply light and/or heat to the 3-D structure to bond the freestanding stacks to one another on the platform. More specifically, the bonding station applies the light and/or the heat after each time the rinsing station transfers each of the freestanding stacks to the platform to independently bond each the freestanding stack to any previously transferred ones of the freestanding stacks of the 3-D structure on the platform.

The structure can also include a support material removal station positioned to receive the 3-D structure from the platform. The support material removal station applies a solvent that dissolves the second material without affecting the first material to leave a 3-D structure made of only the first material.

Presented in method terms, various exemplary methods herein automatically electrostatically transfer a first material to an ITB, and also automatically electrostatically transfer a second material to a location of the ITB where the first material is located on the ITB. Again, the second material dissolves in different solvents relative to solvents that dissolve the first material.

Such methods further automatically feed sheets of media to a platen using a sheet feeder. Further, these methods automatically move the platen toward the ITB to have a sheet of media positioned on the platen contact the ITB to electrostatically transfer a layer of the first material and the second material to the sheet. The layer of the first material and the second material is on a discrete area of the ITB and is in a pattern. After this, the methods automatically move the platen to a heater to join the layer to the sheet. Such methods automatically repeat the process of moving the platen toward the ITB to have the sheet repeatedly contact the ITB to successively form layers of the first material and the second material on the sheet, and after each time the ITB transfers each of the layers to the sheet, these methods automatically repeat the process of the moving the platen to the heater to independently heat each of the layers and successively join each the layer to the sheet and to any previously transferred ones of the layers on the platen.

In later processing, these methods automatically feed the sheet having the layers thereon to a rinsing station, and automatically apply a liquid to dissolve the sheet and leave a freestanding stack of the layers using the rinsing station. The liquid only dissolves the sheet, and does not affect the first material or the second material. For example, the rinsing station comprises a mesh belt and jets positioned to spray the liquid through the mesh belt.

Then, these methods automatically feed the freestanding stack to a platform to successively form a 3-D structure of freestanding stacks of the layers. Subsequently, these methods automatically apply light and/or heat to the 3-D structure to bond the freestanding stacks to one another on the platform using a bonding station. More specifically, the bonding process applies the light and/or heat after each time the rinsing station transfers each of the freestanding stacks to the platform to independently bond each the freestanding stack to any previously transferred ones of the freestanding stacks of the 3-D structure on the platform.

Also, these methods can automatically feed the 3-D structure to a support material removal station and apply a solvent there that dissolves the second material without affecting the first material to leave the 3-D structure made of only the first material at the support material removal station.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, electrostatic printing process are well-known means of generating two-dimensional (2-D) digital images, and the methods and devices herein use such processing for the production of 3-D items (for 3-D printing). However, when performing 3-D printing using electrostatic processes (especially those that use an ITB), the thermal management is a challenge because of the high temperatures used to transfuse the material from the ITB to a platen, where the ITB is cooled before returning to the development device(s). Additionally, with 3-D printing that uses electrostatic processes, the mechanical integrity of the printed material may be compromised if it is very thin, and the transfer process can impose stripping shear forces that damage the material.

In order to address such issues, the devices and methods herein repeatedly electrostatically transfer the developed layers of build and support material from the ITB to a dissolvable media (e.g., a "base structure," such as a water soluble "stabilizer" paper, etc.) to form a series of layers of polymer on the dissolvable media. After many layers have been transferred and fused onto the dissolvable media, liquid is applied to dissolve the dissolvable media to leave a freestanding stack of several build/support layers. Such freestanding stacks are fused to one another, to create a larger stack that is eventually output for solvent application that removes the support material, leaving only the 3-D item of build material. In this way, the 3-D structure is created consisting only of build material.

Figure 1:
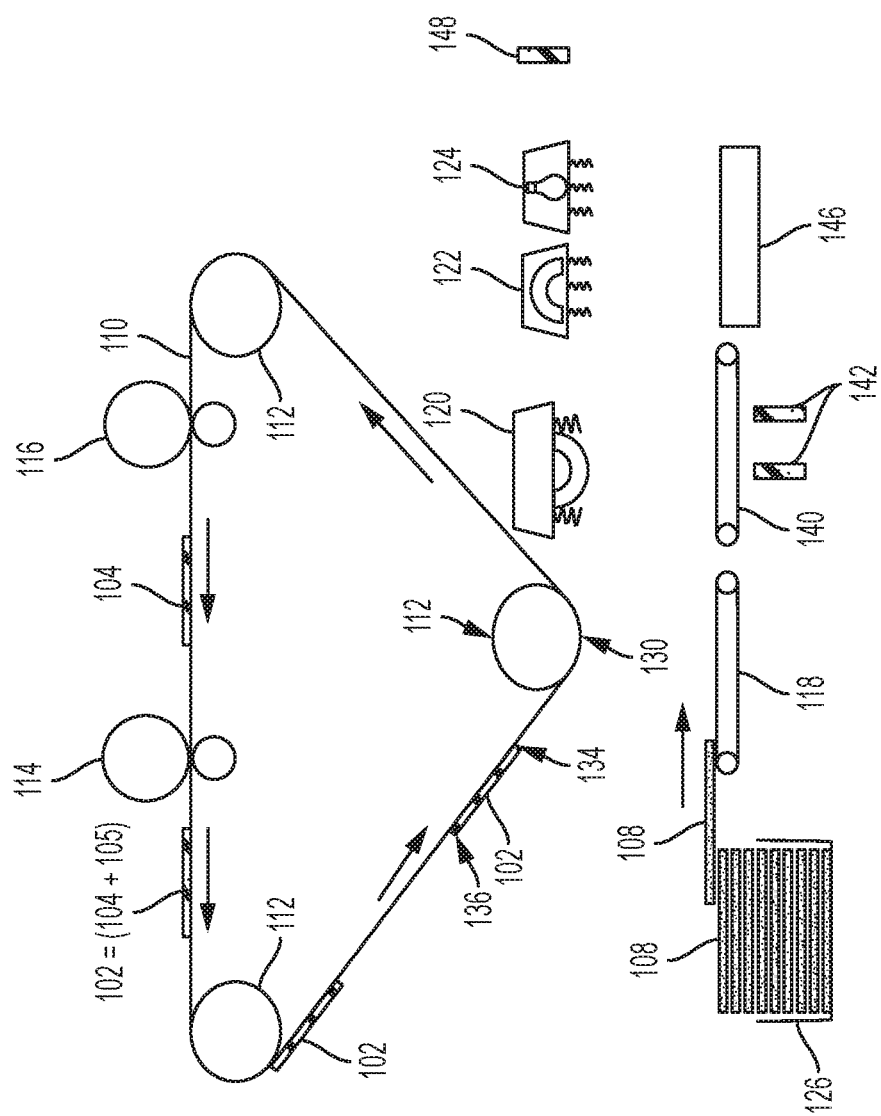
FIGS. 1-5 are schematic cross-section diagrams partially illustrating devices herein.

As shown, for example, in FIG. 1, exemplary three-dimensional (3-D) printers herein include, among other components, an intermediate transfer belt 110 (ITB) supported on rollers 112, a first printing component 116, a second printing component 114, and a platen 118 (which can be a surface or belt) adjacent the ITB 110. Further, a sheet feeder 126 maintains sheets 108 of media. Also, such structures include a heater 120 and a rinsing station 140, 142 positioned adjacent the platen 118. The rinsing station 142 includes a mesh belt 140 and jets 142. Also included is a platform 146, and a bonding station is positioned to apply light (e.g. UV light) using a light source 124 and/or heat using a heater 122. The structure can also include a support material removal station 148.

As shown in FIG. 1, the first printing component 116 (which can be, for example, a photoreceptor) is positioned to electrostatically transfer (by way of charge difference between the belt and the material being transferred) a first material 104 (e.g., the build material, such as a (potentially dry) powder polymer-wax material (e.g., charged 3-D toner)) to the ITB 110, and a second printing component 114 (which can also be, for example, a photoreceptor) is positioned to also electrostatically transfer a second material 105 (e.g., the support material, again such as a powder polymer-wax material (e.g., charged 3-D toner)) to a location of the ITB 110 where the first material 104 is located on the ITB 110.

The support material 105 dissolves in solvents that do not affect the build material 104 to allow the printed 3-D structure 104 to be separated from the support material 105 used in the printing process. In the drawings, the combination of the build material 104 and the support material 105 is shown as element 102, and is referred to as a developed layer. The developed layer 102 of the build material 104 and the support material 105 is on a discrete area of the ITB 110 and is in a pattern corresponding to the components of the 3-D structure in that layer (and its associated support elements), where the 3-D structure is being built, developed layer 102 by developed layer 102.

As shown in FIG. 1, the sheet feeder 126 is positioned to and does feed sheets 108 of media to the platen 118, using well-known, grabbers, rollers, nips, belts, etc. (all generally illustrated by item 126). In this example, the platen 118 is a vacuum belt further moving the sheet 108 and holding the sheet 108 is place during the subsequent processing.

Figure 2:
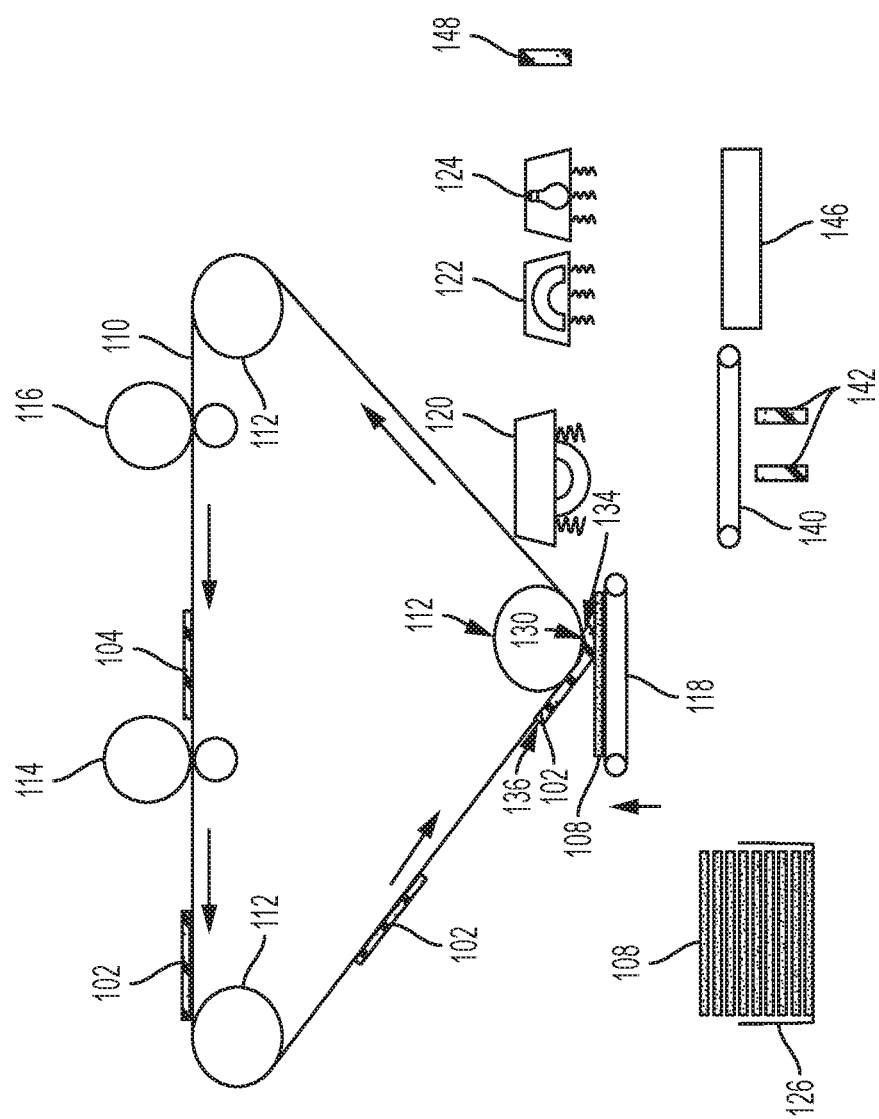

As shown by the vertical arrow in FIG. 2, the platen 118 moves (using motors, gears, pulleys, cables, guides, etc. (all generally illustrated by item 118)) toward the ITB 110 to have the sheet of media 108 that is positioned on the platen 118 make contact with the ITB 110. The ITB 110 electrostatically transfers one of the developed layer 102 of the build material 104 and the support material 105 to the sheet 108 each time the platen 118 contacts the sheet 108 with the ITB 110, to successively form developed layers 102 of the build material 104 and the support material 105 on the sheet 108.

Such build and support material are printed in a pattern on the ITB by each separate development device 114, 116, and combine together in the developed layers 102 to represent a specific pattern having a predetermined length. Thus, each of the developed layers 102 has a leading edge 134 oriented toward the processing direction in which the ITB 110 is moving (represented by arrows next to the ITB 110) and a trailing edge 136 opposite the leading edge 134.

More specifically, as shown in FIG. 2, at the transfuse nip 130, the leading edge 134 of the developed layer 102 within the transfuse nip 130 begins to be transferred to a corresponding location of the platen 118. Thus, in FIG. 2, the platen 118 moves to contact the developed layer 102 on the ITB 110 at a location where the leading edge 134 of the developed layer 102 is at the lowest location of the roller of the transfuse nip 130. Thus, in this example, the trailing edge 136 of the developed layer 102 has not yet reached the transfuse nip 130 and has not, therefore, yet been transferred to the platen 118.

Figure 3:
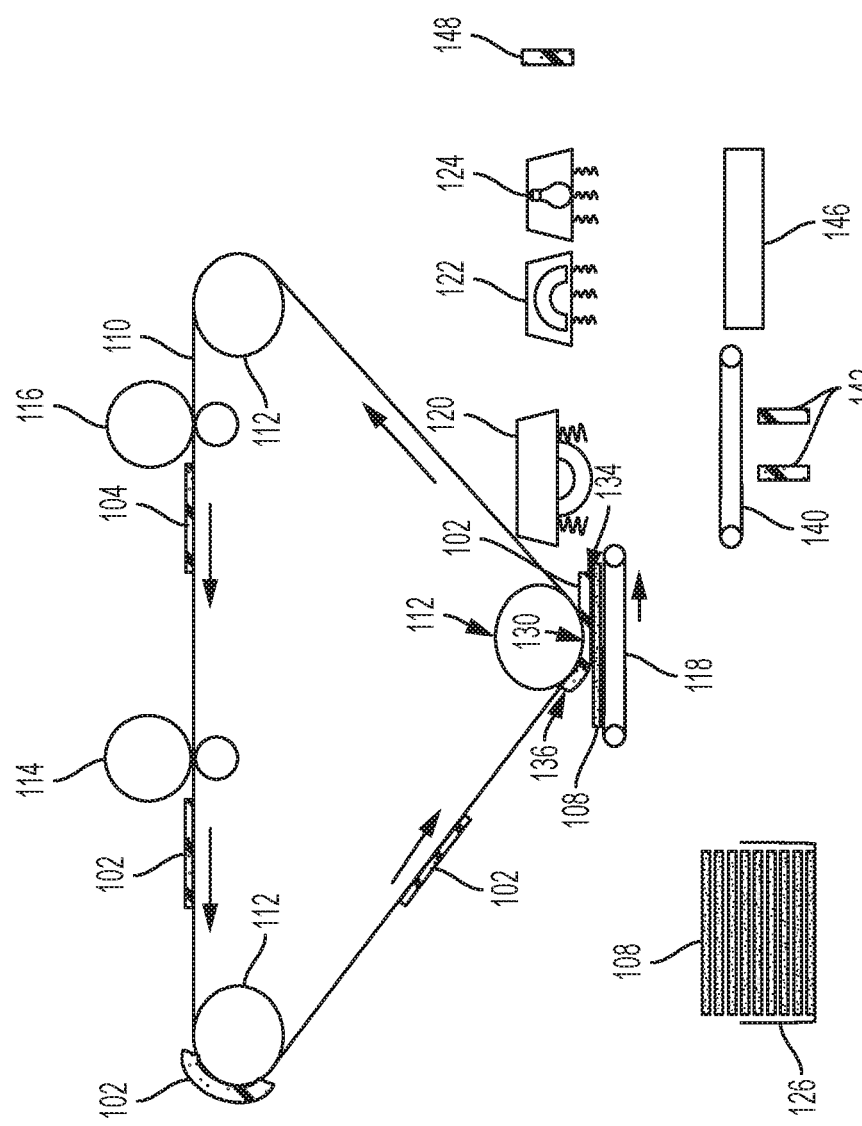
Figure 4:
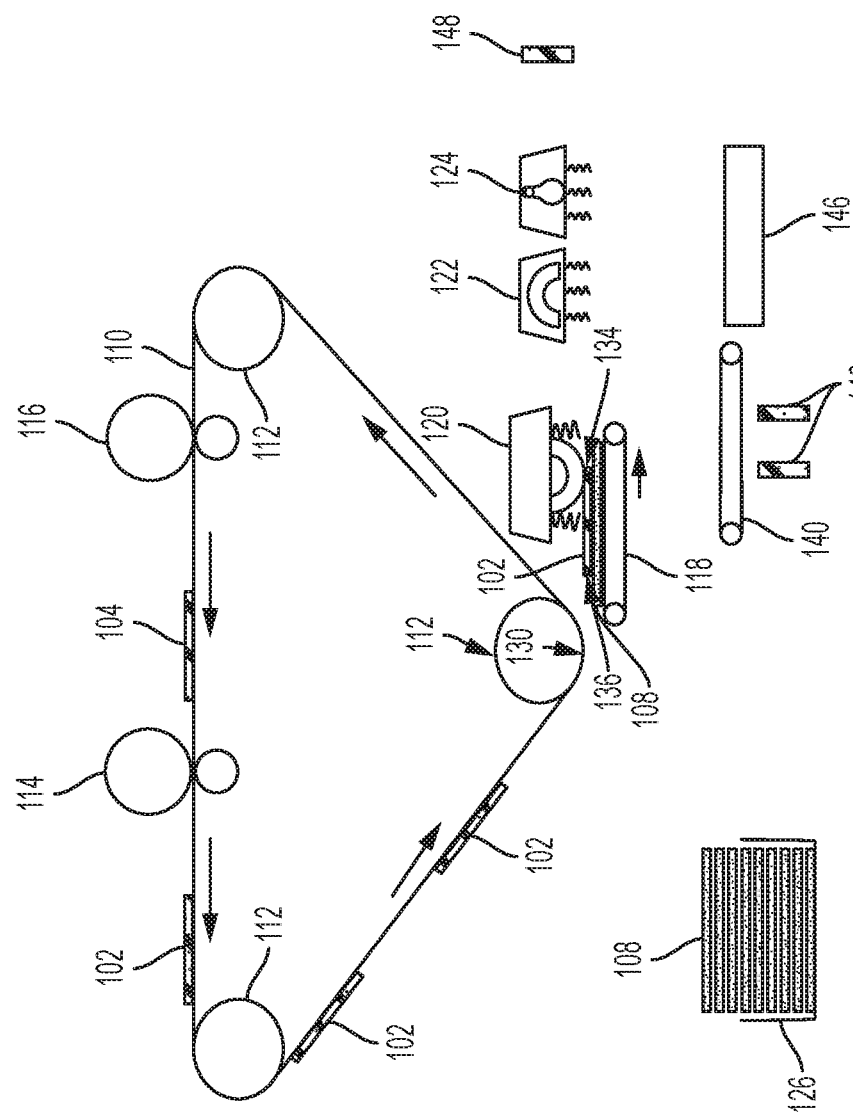

As shown in FIG. 3, the platen 118 moves synchronously with the ITB 110 (moves at the same speed and the same direction as the ITB 110) either by moving or rotating the platen vacuum belt, to allow the developed layers 102 to transfer cleanly to the platen 118, without smearing. In FIG. 3, the trailing edge 136 of the developed layer 102 is the only portion that has not yet reached the transfuse nip 130 and has not, therefore, been transferred to the platen 118 or partially formed part 106. Then, as the ITB 110 moves in the processing direction, the platen 118 moves at the same speed and in the same direction as the ITB 110, until the trailing edge 136 of the developed layer 102 reaches the bottom of the roller of the transfuse nip 130, at which point the platen 118 moves away from the ITB 110 and over to the heater 120, as shown in FIG. 4 (the heater 120 can be a non-contact (e.g., infrared (IR) heater, or a pressure heater, such as a fuser roller).

Figure 5:
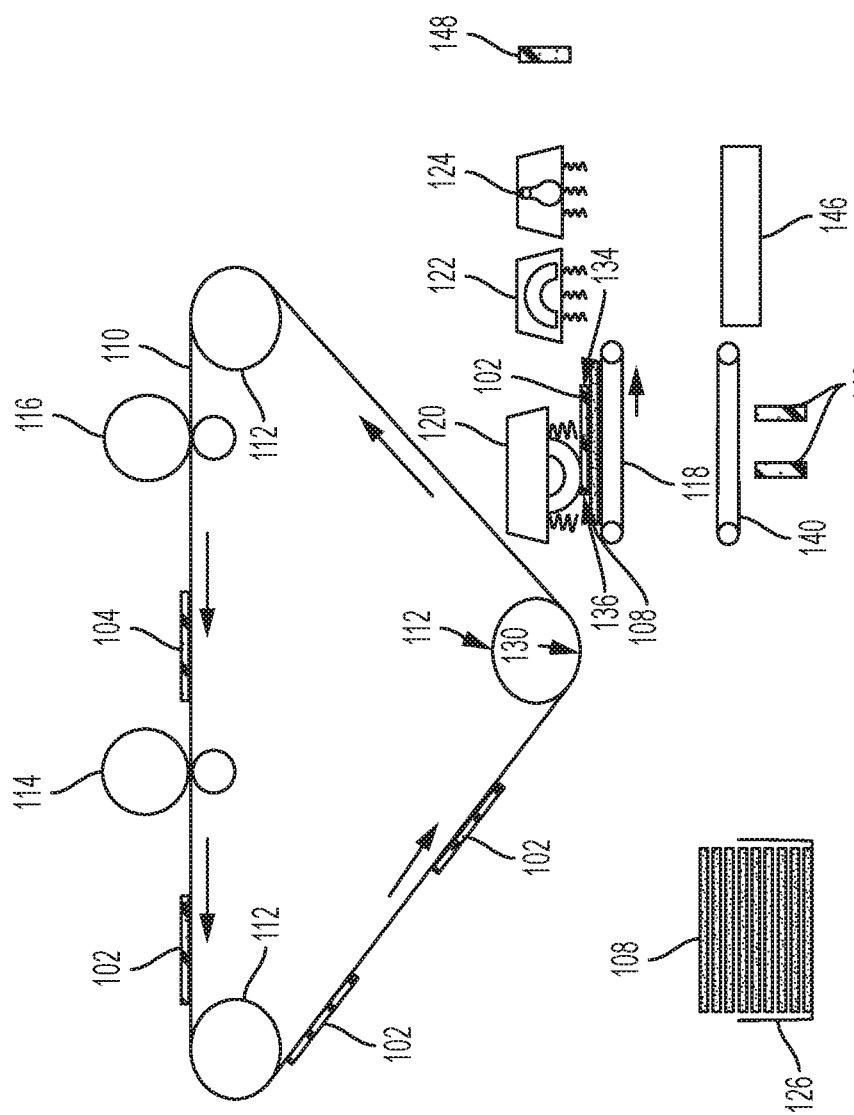

As shown in FIG. 5, if the heater 120 is a pressure roller, the platen 118 moves synchronously as the roller rotates, heating and pressing to fuse the developed layer 102 to the sheet 108. This synchronous movement between the platen 118 and the ITB 110 (and heater roller 120) causes the pattern of support and build materials (102) that is printed by the development devices 116, 114 to be transferred precisely from the ITB 110 to the platen 118, without distortion or smearing.

The platen 118 can move to the heater 120 and bonding heater/UV light 122/124 after each time the ITB 110 transfers each of the developed layers 102 to the sheet 108 to independently heat each of the developed layers 102 and successively join each the developed layer 102 to the sheet 108 and to any previously transferred developed layers 102 on the sheet 108. In other alternatives, the platen 118 may only move to the heater 120 and bonding heater/UV light 122/124 after a specific number (e.g., 2, 3, 4, etc.) of the developed layers 102 have been placed on the sheet 108 to allow multiple developed layers 102 to be simultaneously fused to the sheet 108 and to each other.

Figure 6:
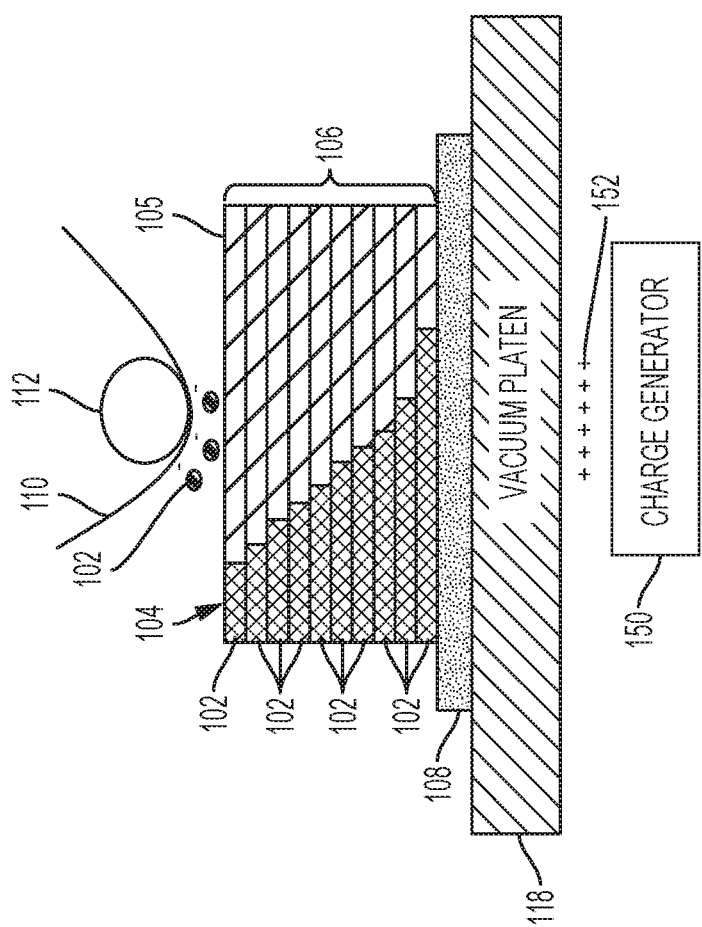
FIG. 6 is an expanded schematic diagram illustrating devices herein.

Thus, the processing in FIGS. 2-5 is repeated to fuse multiple developed layers 102 to the sheet 108 (and to one another), as shown in FIG. 6. FIG. 6 is an expanded diagram showing how the developed layers 102 may contain some of the build material 104 and some of the support material 105, and how the lowest developed layer 102 is joined to the sheet 108, and how each successive developed layer 102 contacts and is joined to the immediately preceding adjacent developed layer 102 that is below (e.g., is between the layer 102 and the sheet 108) to form a stack 106 of developed layers 102 on the single sheet 108.

As noted above, the particles of build materials 104 and support material 105 within the developed layer 102 (shown as particles (not drawn to scale) in FIG. 6, using identification number 102) are charged particles, and FIG. 6 shows these items as negatively charged particles (or they could be positively charged). As is understood by those ordinarily skilled in the art, the printing components 114, 116 provide the charge to the particles 102 in order to have such particles electrostatically transfer to the ITB 110. A charge generator 150 can be used to create an opposite charge 152 (in this case a positive charge) on the opposite side of the platen 118, and this opposite charge 152 draws the charged particles 102 from the ITB 110 to the top of the stack 106.

Figure 7:
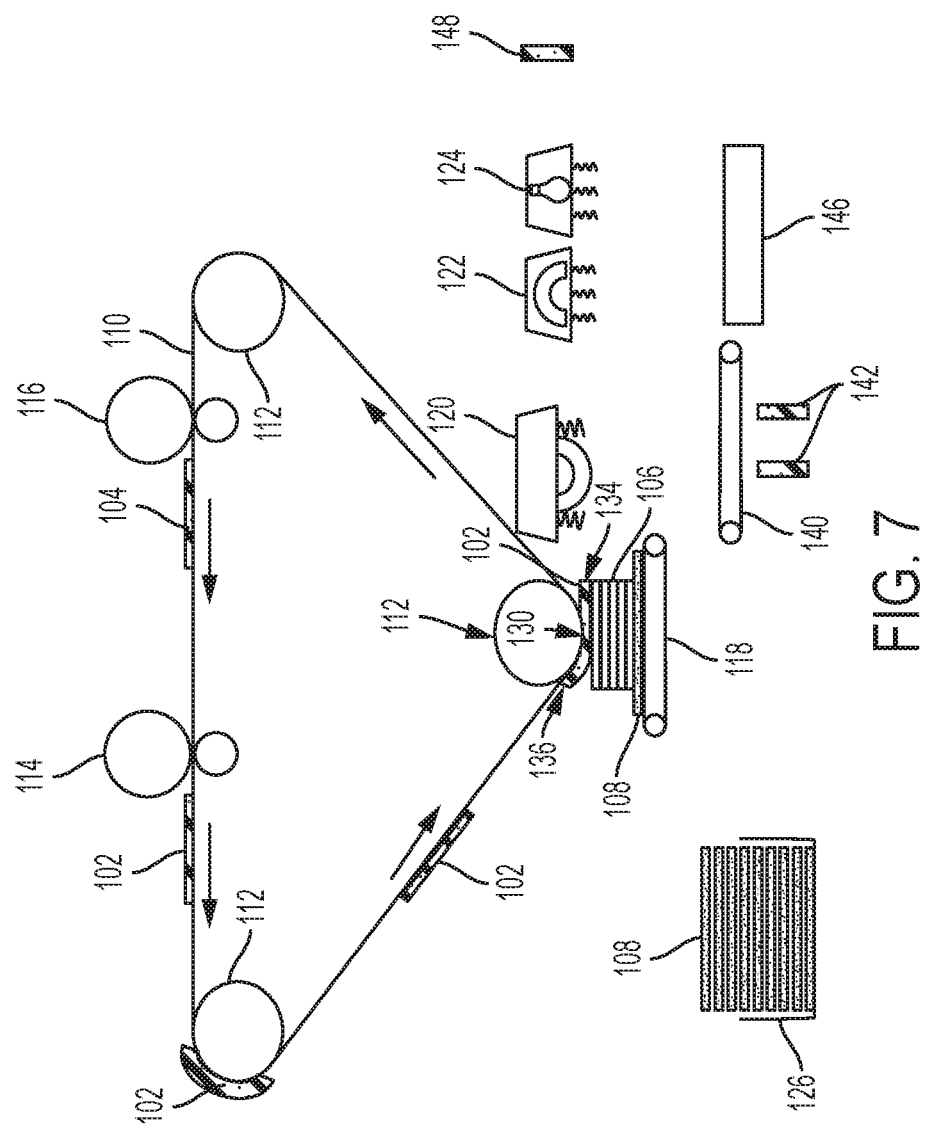
FIGS. 7-19 are schematic cross-section diagrams partially illustrating devices herein.
Figure 8:
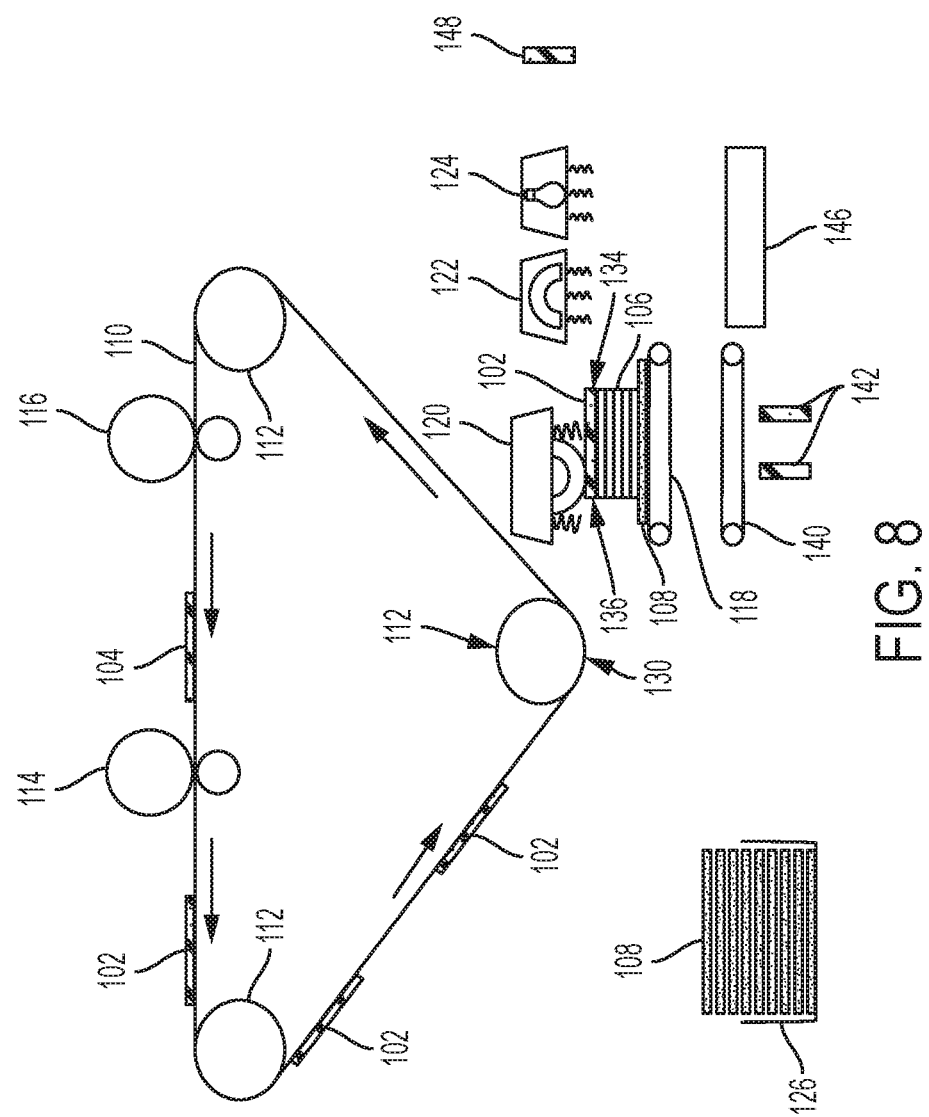

As the stack 106 of the developed layers 102 grows, additional developed layers 102 are formed on top of the stack 106, as shown in FIG. 7, and such additional developed layers 102 are heated by the heater 120, as shown in FIG. 8, to fuse all the develop layers 102 within the stack 106 together.

Figure 9:
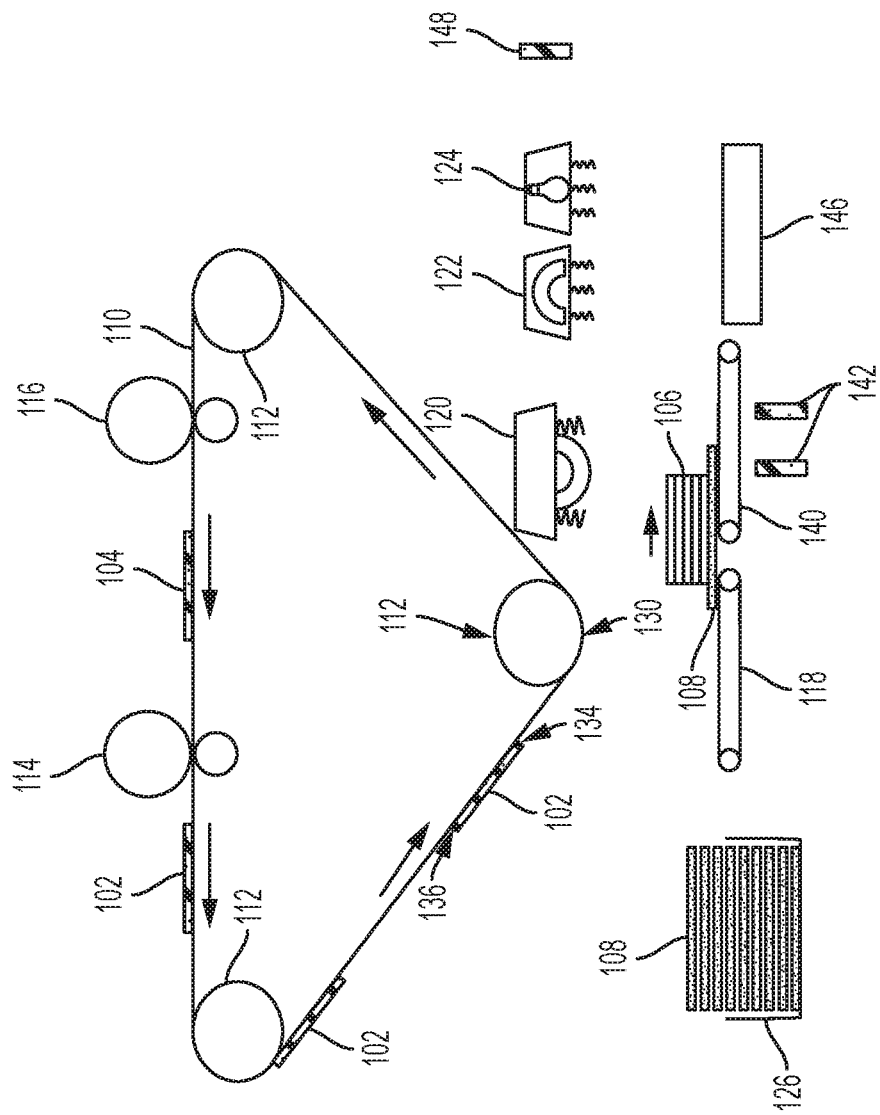

However, at some point, the height of the stack 106 will make the distance between the charged (build and support) particles 102 greater than the ability of the opposite charges 152 to attract the charged particles 102 (and this height will vary, depending upon the strength of the various charges), as shown in FIG. 6. When the stack 106 height reaches this point (or before), processing then transfers the sheet 108 and the stack 106 to the rinsing station 142, as shown in FIG. 9.

Figure 10:
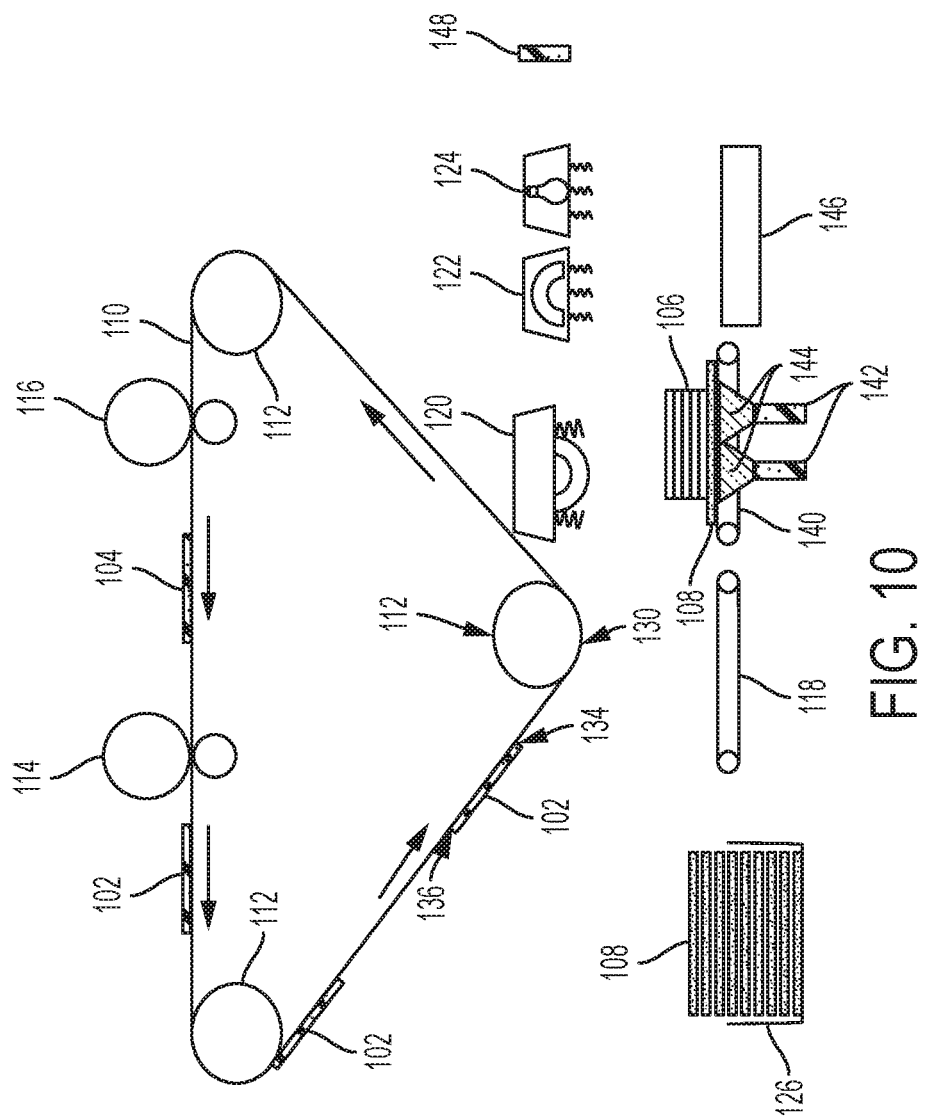

More specifically, the rinsing station 142 is positioned to receive, from the platen 118, the sheet 108 having the transferred developed layers 102 thereon. As shown in FIG. 10, the rinsing station 142 applies a liquid 144 to dissolve the sheet 108 and leave a freestanding stack 106 of the developed layers 102 (shown in FIG. 11). The rinsing station 142 comprises a mesh belt 140 and jets 142 positioned to spray the liquid 144 through the mesh belt 140. The liquid 144 only dissolves the sheet 108, and does not affect the build material 104 or the support material 105.

In one example, the sheets 108 can be water-soluble, so that the liquid 144 used in FIG. 10 can be water. However, the sheets 108 can be formed of any material that is dissolvable in a solvent that does not affect the build material 104 or the support material 105. For example, the sheets 108 can be formed of any form a plastic, polymer, rubber, cloth, paper, etc. Thus, the devices and methods described herein and work with any materials for the sheets 108, build material 104, and support material 105, so long as these materials are selectively dissolvable in different solvents that do not affect the other materials.

Figure 12:
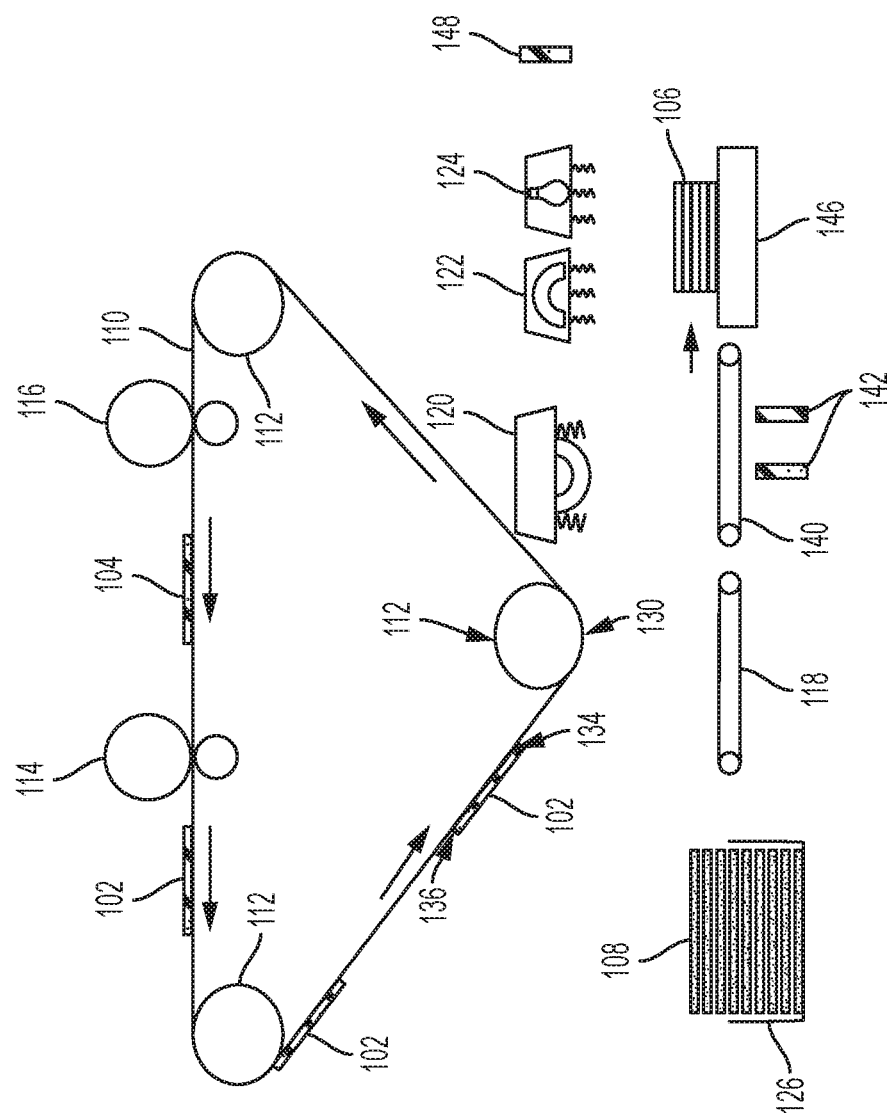

As shown in FIG. 12, the platform 146 is positioned to receive, from the rinsing station 142, the freestanding stack 106. Also, the bonding station 122, 124 is configured to apply light and/or heat to the 3-D structure to bond the developed layers 102 in the freestanding stack 106 to one another on the platform 146. The selective use of heaters, lights, and other components 122, 124 of the bonding station will vary depending upon the chemical makeup of the developed layers 102.

In one example, the build material 104 can include UV curable toners. Bonding station 122, 124 bonds such materials by heating the materials to a temperature between their glass transition temperature and their melting temperature, and then applies UV light to cross-link the polymers within the materials, thereby creating a rigid structure. Those ordinarily skilled in the art would understand that other build and support materials would utilize other bonding processing and bonding components, and that the foregoing is presented only as one limited example; and the devices and methods herein are applicable to all such bonding methods and components, whether currently known or developed in the future.

Figure 13:
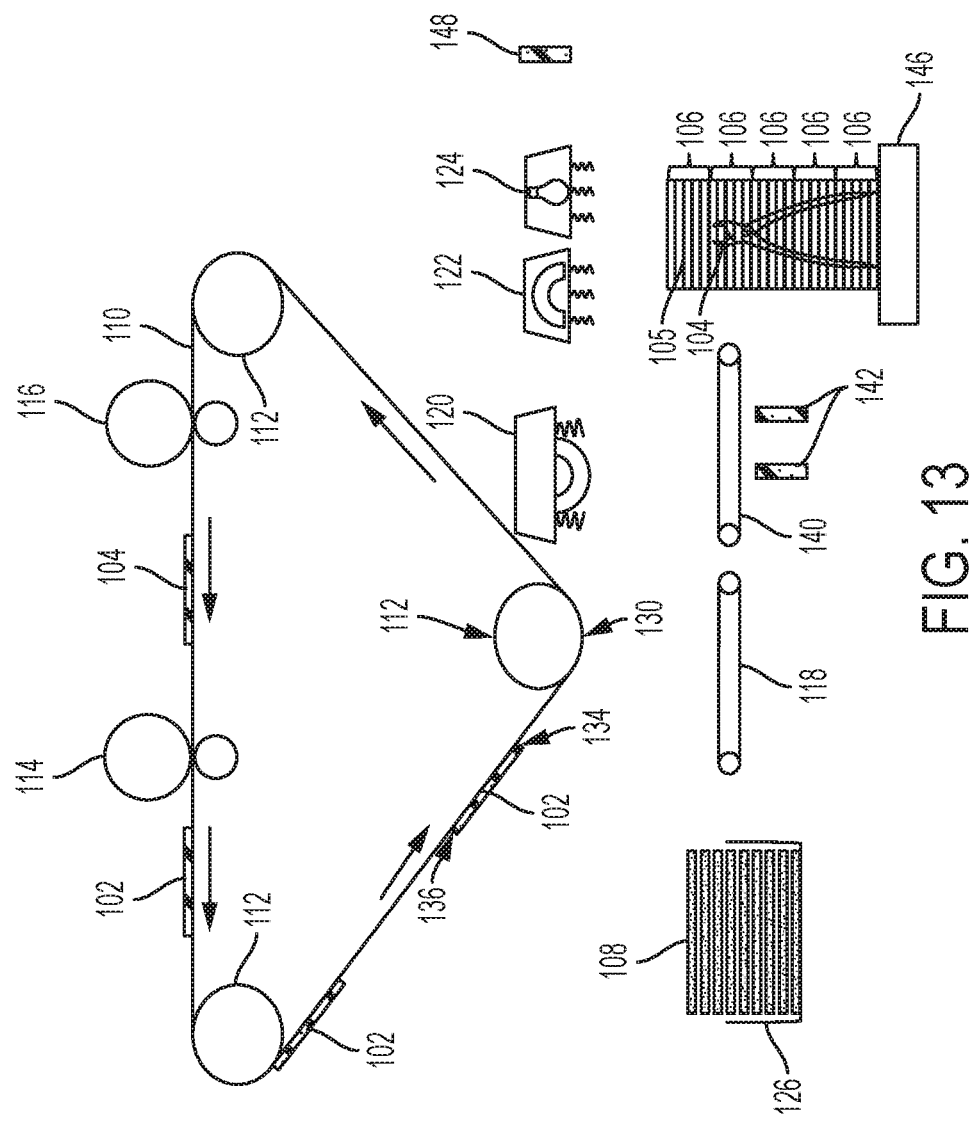

Therefore, the bonding station 122, 124 applies light and/or heat after each time the rinsing station 142 transfers each of the freestanding stacks 106 to the platform 146, to independently bond the developed layers 102 in each of the freestanding stacks 106 to each other, and to any previously transferred freestanding stacks 106 of the 3-D structure on the platform 146, as shown in FIG. 13, to successively form a 3-D structure of freestanding stacks 106. In addition, FIG. 13 illustrates an overlay showing portions of support material 105 and build material 104 within the accumulation of freestanding stacks 106. Such may or may not be visible, and is only illustrated to show one exemplary way in which such build and support materials may be arranged.

Figure 14:
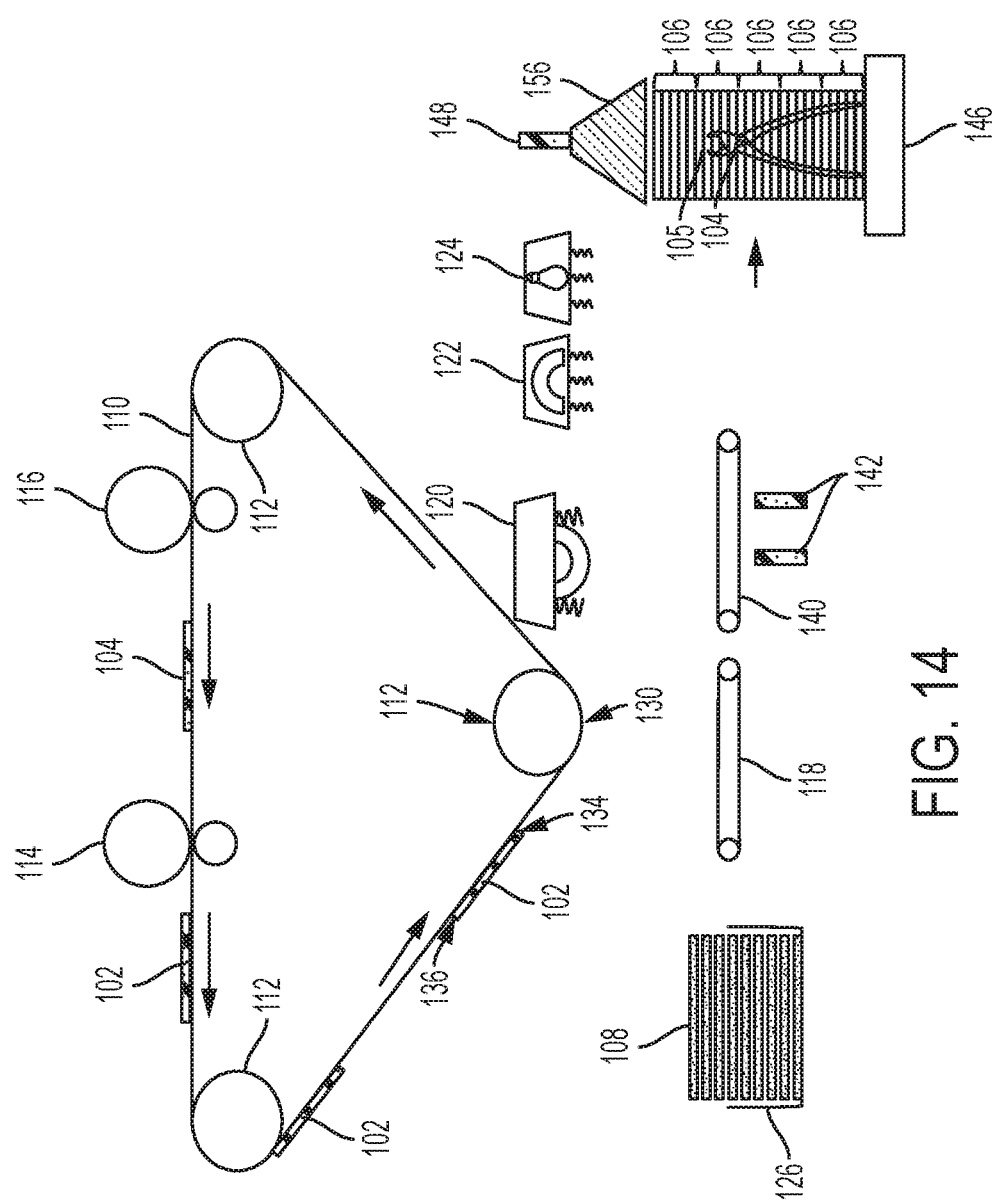
Figure 15:
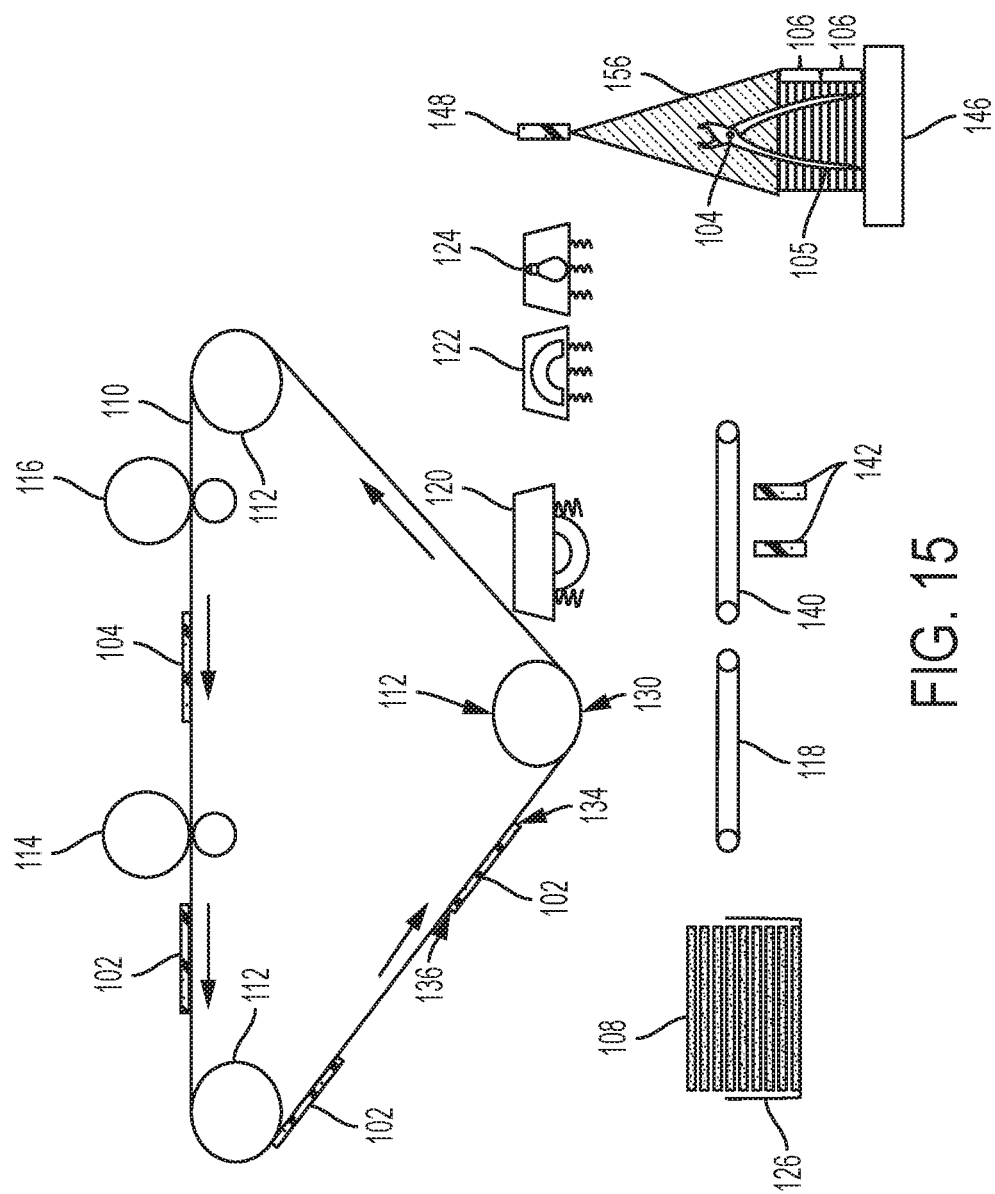
Figure 16:
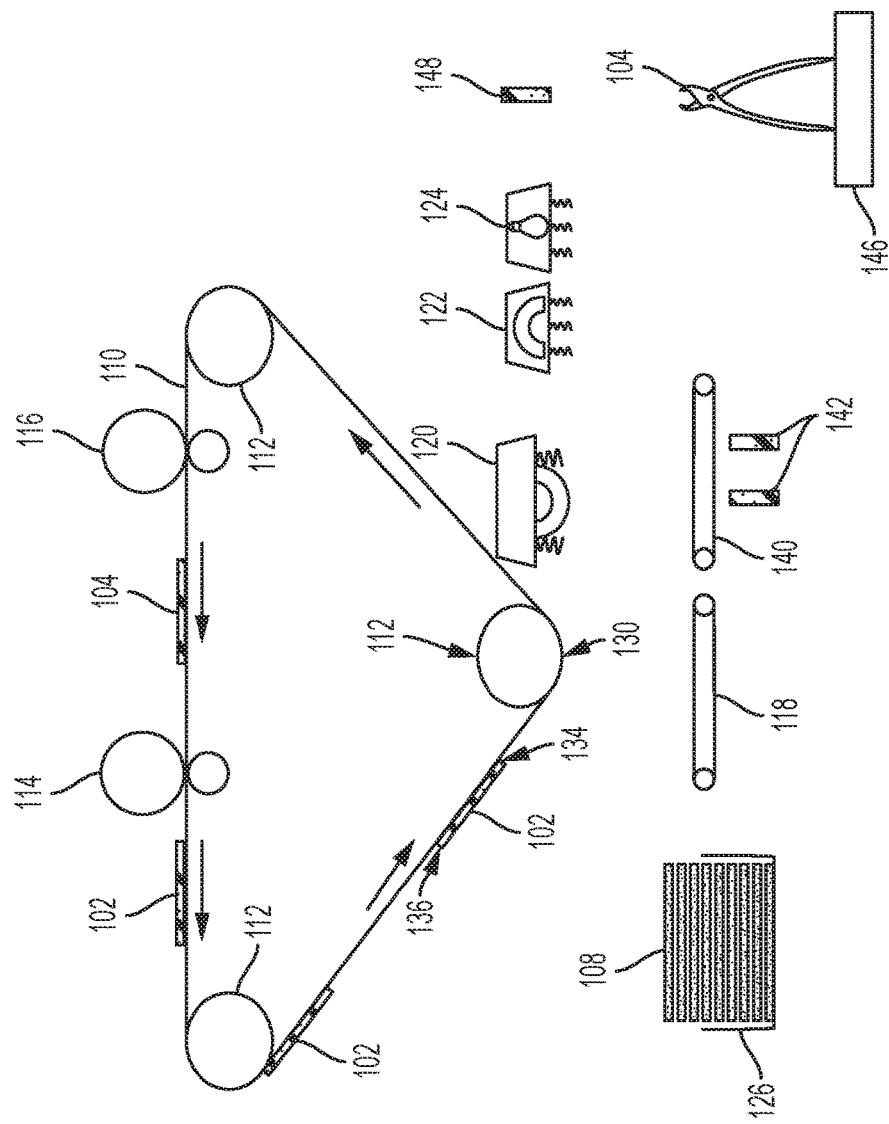

The 3-D structure of freestanding stacks 106 can be output to allow manual removal of the support material 105 using an external solvent bath; or processing can proceed as shown in FIG. 14-16. More specifically, in FIG. 14, the support material removal station 148 is positioned to receive the now bonded 3-D structure of freestanding stacks 106 from the platform 146. The support material removal station 148 applies a solvent 156 that dissolves the support material 105 without affecting the build material 104. Again, as noted above, the solvent utilized will depend upon the chemical makeup of the build material 104 and the support material 105. FIG. 15 illustrates the processing where about half of the support material 105 remains, and a portion of the build material 104 protrudes from the remaining stack of support material 105. FIG. 16 illustrates processing after the support material removal station 148 has applied sufficient solvent 156 to dissolve all the support material 105, leaving only the build material 104 remaining, which leave a completed 3-D structure made of only the build material 104.

Figure 17:
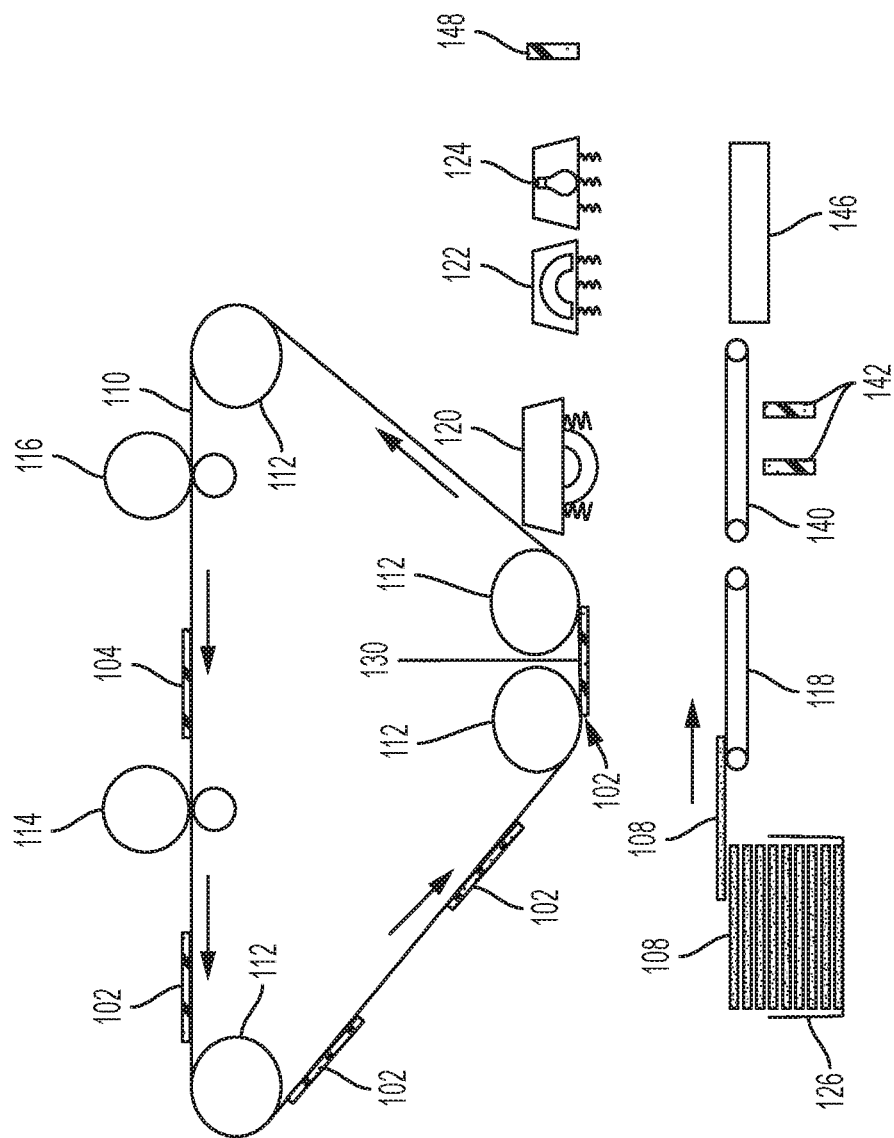
Figure 18:
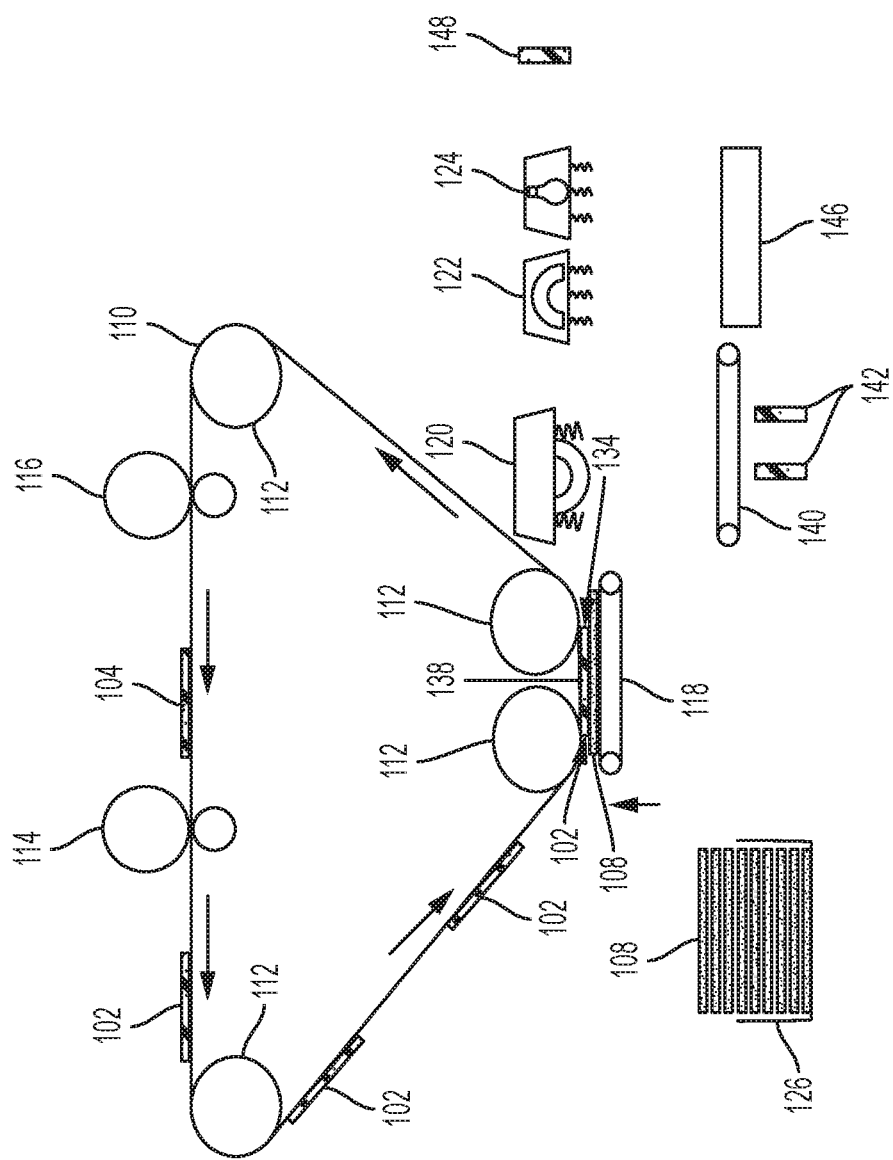

FIGS. 17 and 18 illustrate an alternative 3-D electrostatic printing structure herein which includes a planar transfuse station 138 in place of the transfuse nip 130 shown in FIG. 2. As shown in FIG. 17, the planar transfuse station 138 is a planar portion of the ITB 110 that is between rollers 112 and is parallel to the platen 118. As shown in FIG. 18, with this structure, when the platen 118 moves to contact the planar transfuse station 138, all of the developed layer 102 is transferred simultaneously to the platen 118 or partially formed stack 106, avoiding the rolling transfuses process shown in FIGS. 2 and 3.

Figure 19:
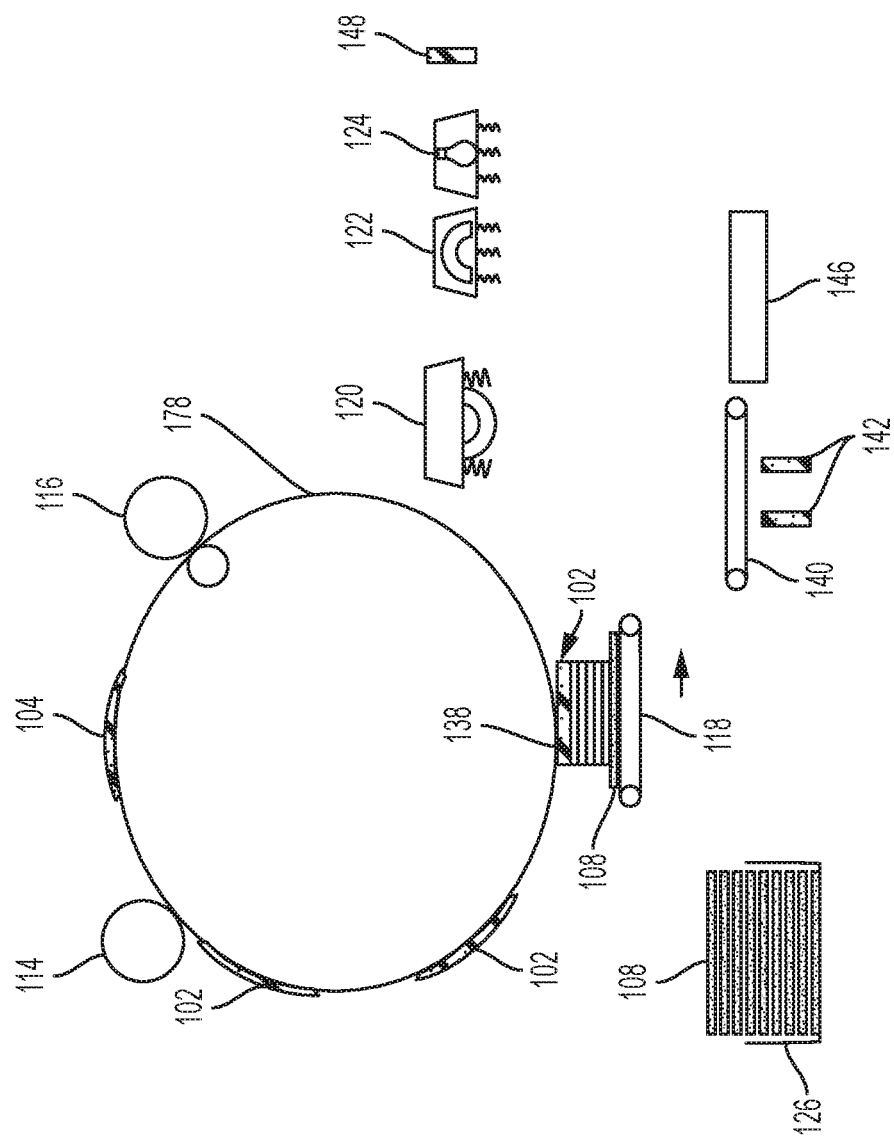

Similarly, as shown in FIG. 19, a drum 178 could be used in place of the ITB 110, with all other components operating as described herein. Thus, the drum 178 could be an intermediate transfer surface receiving material from development stations 114, 116, as described above, or could be a photoreceptor and operate as the photoreceptor 256 described below operates, by maintaining a latent image of charge and receiving materials from development devices 254.

Figure 20:
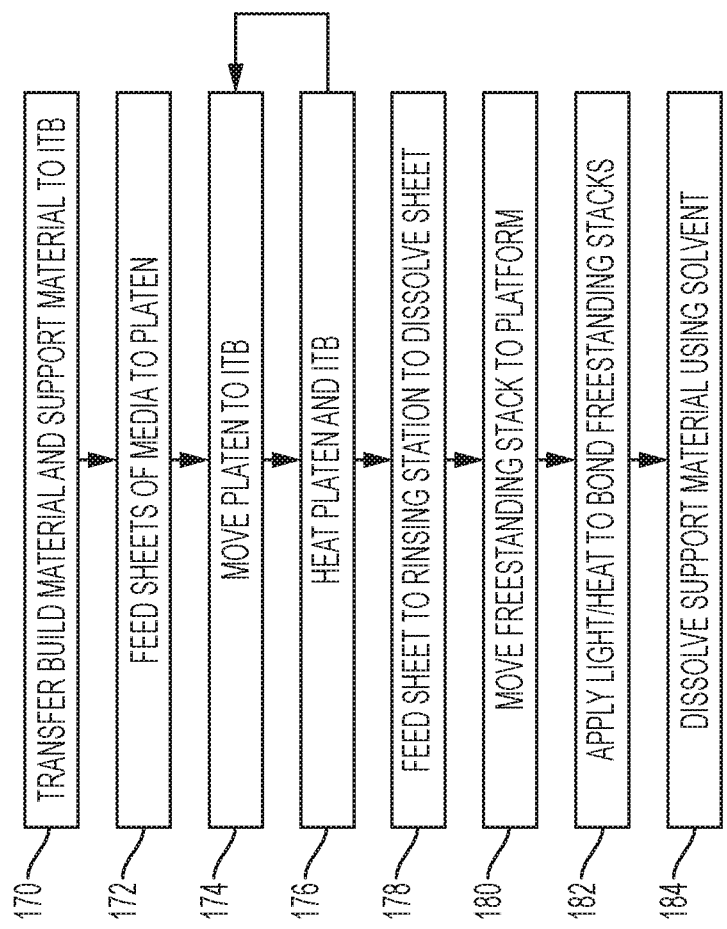
FIG. 20 is a flow diagram of various methods herein.

FIG. 20 is flowchart illustrating exemplary methods herein. In item 170, various exemplary methods herein automatically electrostatically transfer first and second materials to an ITB. In item 170, the second material is transferred on the first material (e.g., to a location of the ITB where the first material is already located on the ITB). Again, the second material dissolves in different solvents relative to solvents that dissolve the first material.

In item 172, such methods further automatically feed sheets of media to a platen using a sheet feeder. Further, in item 174, these methods automatically move the platen toward the ITB to have a sheet of media positioned on the platen contact the ITB to electrostatically transfer a layer of the first material and the second material to the sheet. The layer of the first material and the second material is on a discrete area of the ITB and is in a pattern.

After this, in item 176, the methods automatically move the platen to a heater to join the layer to the sheet. As shown by the arrow from item 176 to item 174, such methods automatically repeat the process of moving the platen toward the ITB to have the sheet repeatedly contact the ITB to successively form layers of the first material and the second material on the sheet, and after each time the ITB transfers each of the layers to the sheet, these methods automatically repeat the process of the moving the platen to the heater to independently heat each of the layers and successively join each the layer to the sheet and to any previously transferred ones of the layers on the platen.

In item 178, these methods automatically feed the sheet having the layers thereon to a rinsing station, and automatically apply a liquid to dissolve the sheet and leave a freestanding stack of the layers using the rinsing station. The liquid only dissolves the sheet, and does not affect the first material or the second material. For example, the rinsing station comprises a mesh belt and jets positioned to spray the liquid through the mesh belt.

Then, in item 180, these methods automatically feed the freestanding stack to a platform to successively form a 3D structure of freestanding stacks of the layers. In item 182, these methods automatically apply light and/or heat to the 3-D structure to bond the freestanding stacks to one another on the platform using a bonding station. More specifically, the bonding process in item 182 applies the light and/or heat after each time the rinsing station transfers each of the freestanding stacks to the platform to independently bond each the freestanding stack to any previously transferred ones of the freestanding stacks of the 3-D structure on the platform.

Also, in item 184, these methods can automatically feed the 3D structure to a support material removal station and apply a solvent there that dissolves the second material without affecting the first material to leave the 3D structure made of only the second material at the support material removal station.

Figure 21:
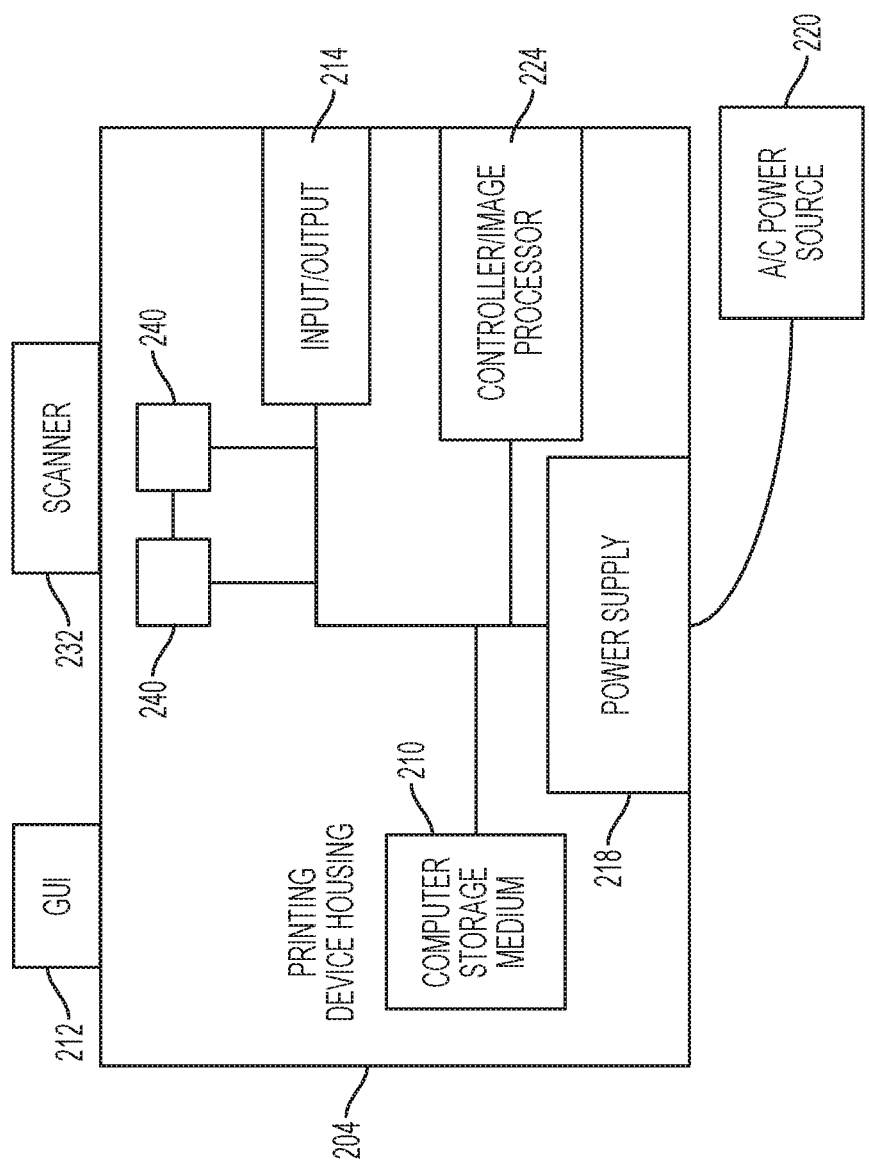
FIGS. 21-23 are schematic cross-section diagrams partially illustrating devices herein.

FIG. 21 illustrates many components of 3-D printer structures 204 herein. The 3-D printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the 3-D printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 21, a body housing has one or more functional components that operate on power supplied from an alternating current (AC) source 220 by the power supply 218. The power supply 218 can comprise a common power conversion unit, power storage element (e.g., a battery, etc), etc.

The 3-D printing device 204 includes at least one marking device (printing engine(s)) 240 that deposits successive layers of build and support material on a platen as described above, and are operatively connected to a specialized image processor 224 (that is different than a general purpose computer because it is specialized for processing image data). Also, the printing device 204 can include at least one accessory functional component (such as a scanner 232) that also operates on the power supplied from the external power source 220 (through the power supply 218).

Figure 22:
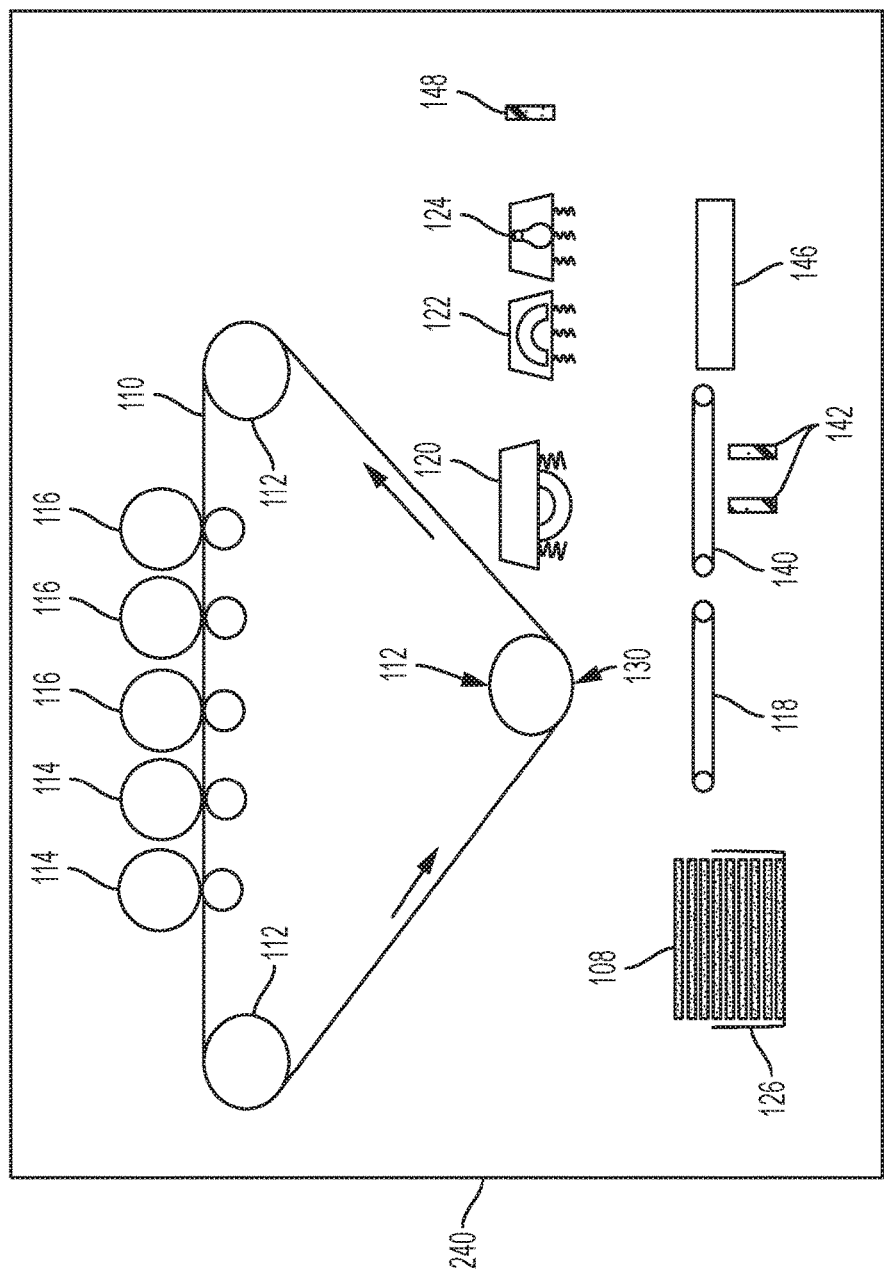

The one or more printing engines 240 are intended to illustrate any marking device that applies build and support materials (toner, etc.) whether currently known or developed in the future and can include, for example, devices that use an intermediate transfer belt 110 (as shown in FIG. 22).

Figure 11:
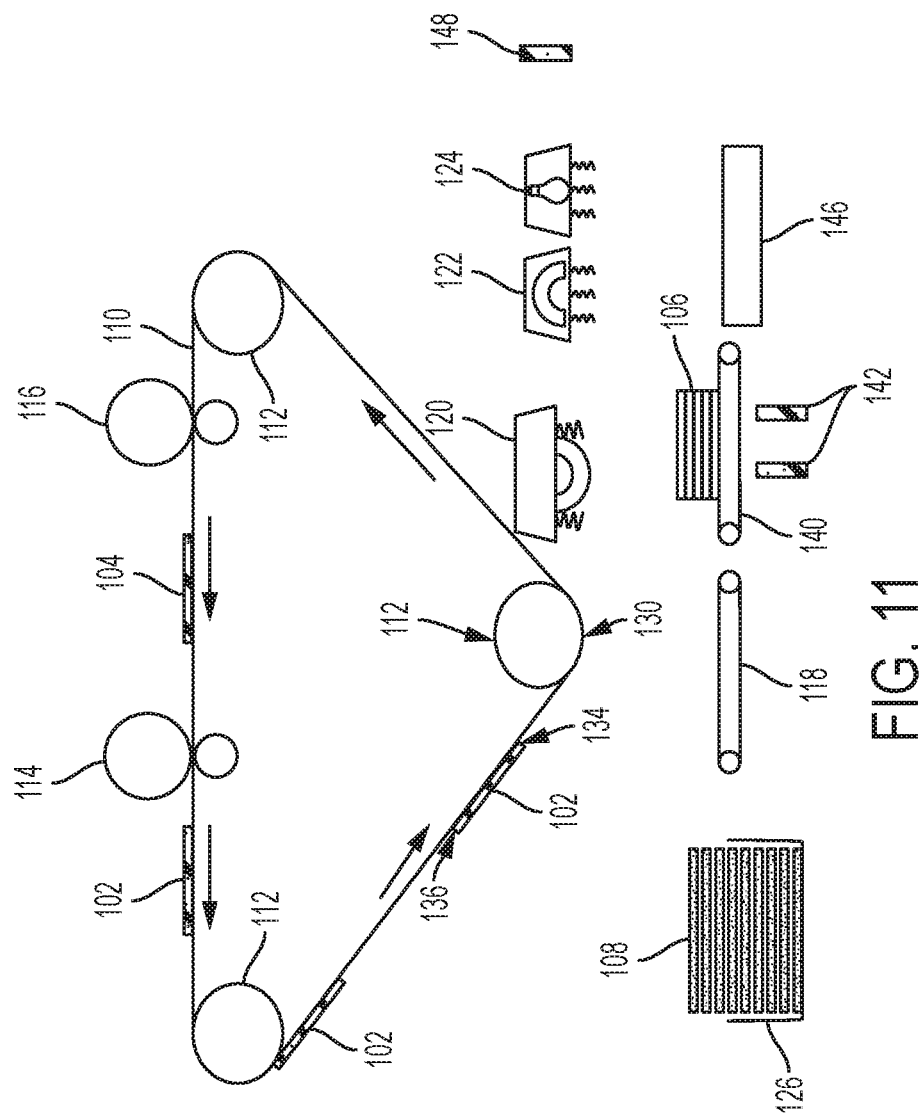

Thus, as shown in FIG. 22, each of the printing engine(s) 240 shown in FIG. 11 can utilize one or more potentially different (e.g., different color, different material, etc.) build material development stations 116, one or more potentially different (e.g., different color, different material, etc.) support material development stations 114, etc. The development stations 114, 116 can be any form of development station, whether currently known or developed in the future, such as individual electrostatic marking stations, individual inkjet stations, individual dry ink stations, etc. Each of the development stations 114, 116 transfers a pattern of material to the same location of the intermediate transfer belt 110 in sequence during a single belt rotation (potentially independently of a condition of the intermediate transfer belt 110) thereby, reducing the number of passes the intermediate transfer belt 110 must make before a full and complete image is transferred to the intermediate transfer belt 110.

Figure 23:
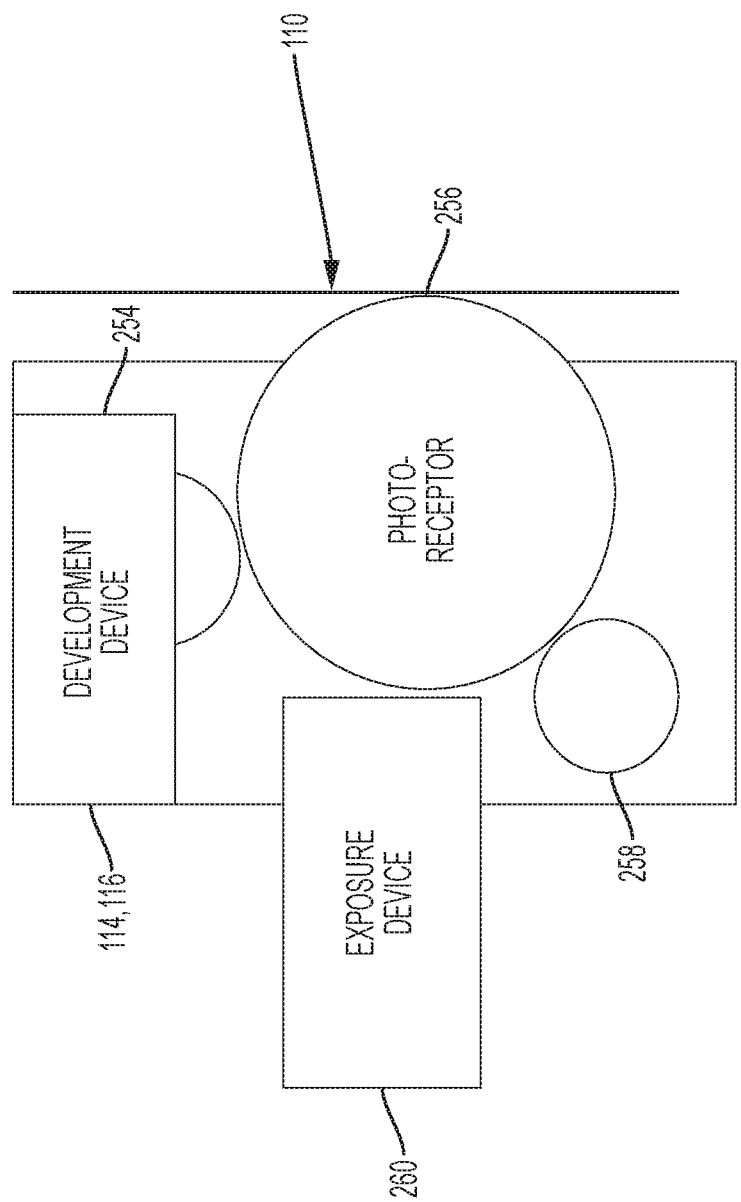

One exemplary individual electrostatic development station 114, 116 is shown in FIG. 23 positioned adjacent to (or potentially in contact with) intermediate transfer belt 110. Each of the individual electrostatic development stations 114, 116 includes its own charging station 258 that creates a uniform charge on an internal photoreceptor 256, an internal exposure device 260 that patterns the uniform charge into a patterned charge on the photoreceptor, and an internal development device 254 that transfers build or support material to the photoreceptor 256. The pattern of build or support material is then transferred from the photoreceptor 256 to the intermediate transfer belt 110 and eventually from the intermediate transfer belt to the sheet 108. While FIG. 23 illustrates five development stations adjacent or in contact with a rotating belt (110), as would be understood by those ordinarily skilled in the art, such devices could use any number of marking stations (e.g., 2, 3, 5, 8, 11, etc.).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

As shown in U.S. Pat. No. 8,488,994, an additive manufacturing system for printing a 3-D part using electrophotography is known. The system includes a photoconductor component having a surface, and a development station, where the development station is configured to developed layers of a material on the surface of the photoconductor component. The system also includes a transfer medium configured to receive the developed layers from the surface of the rotatable photoconductor component, and a platen configured to receive the developed layers from the transfer component in a layer-by-layer manner to print the 3-D part from at least a portion of the received layers.

With respect to UV curable toners, as disclosed in U.S. Pat. No. 7,250,238 it is known to provide a UV curable toner composition, as are methods of utilizing the UV curable toner compositions in printing processes. U.S. Pat. No. 7,250,238 discloses various toner emulsion aggregation processes that permit the generation of toners that in embodiments can be cured, that is by the exposure to UV radiation, such as UV light of has about 100 nm to about 400 nm. In U.S. Pat. No. 7,250,238, the toner compositions produced can be utilized in various printing applications such as temperature sensitive packaging and the production of foil seals. In U.S. Pat. No. 7,250,238 embodiments relate to a UV curable toner composition comprised of an optional colorant, an optional wax, a polymer generated from styrene, and acrylate selected from the group consisting of butyl acrylate, carboxyethyl acrylate, and a UV light curable acrylate oligomer. Additionally, these aspects relate to a toner composition comprised of a colorant such as a pigment, an optional wax, and a polymer generated from a UV curable cycloaliphatic epoxide.

Moreover, U.S. Pat. No. 7,250,238 discloses a method of forming a UV curable toner composition comprising mixing a latex containing a polymer formed from styrene, butyl acrylate, a carboxymethyl acrylate, and a UV curable acrylate with a colorant and wax; adding flocculant to this mixture to optionally induce aggregation and form toner precursor particles dispersed in a second mixture; heating the toner precursor particles to a temperature equal to or higher than the glass transition temperature (Tg) of the polymer to form toner particles; optionally washing the toner particles; and optionally drying the toner particles. A further aspect relates to the toner particles produced by this method.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

For the purposes of this invention, the term fixing means the drying, hardening, polymerization, crosslinking, binding, or addition reaction or other reaction of the coating. In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:
1. A three-dimensional (3-D) printer comprising:
an intermediate transfer surface having a layer of a first material and a second material, said layer of said first material and said second material is on a discrete area of said intermediate transfer surface and is in a pattern;

a platen moving relative to said intermediate transfer surface;

a sheet feeder positioned to feed sheets of media to said platen, said platen moves toward said intermediate transfer surface to have a sheet of said media positioned on said platen contact said intermediate transfer surface, said intermediate transfer surface electrostatically transfers said layer of said first material and said second material to said sheet each time said platen contacts said sheet with said intermediate transfer surface to successively form layers of said first material and said second material on said sheet;

a rinsing station positioned to receive, from said platen, said sheet having thereon said layers, said rinsing station applies a liquid to dissolve said sheet and leave a freestanding stack of said layers; and a platform positioned to receive, from said rinsing station, said freestanding stack to successively form a 3-D structure of freestanding stacks of said layers.

2. The 3-D printer according to claim 1, said liquid only dissolves said sheet, and does not affect said first material or said second material.

3. The 3-D printer according to claim 1, said rinsing station comprises a mesh belt and jets positioned to spray said liquid through said mesh belt.

4. The 3-D printer according to claim 1, further comprising a bonding station positioned to apply light and/or heat to said 3-D structure to bond said freestanding stacks to one another on said platform, said bonding station applies said light and/or said heat after each time said rinsing station transfers each of said freestanding stacks to said platform to independently bond each said freestanding stack to any previously transferred ones of said freestanding stacks of said 3-D structure on said platform.

5. The 3-D printer according to claim 1, further comprising a support material removal station positioned to receive said 3-D structure from said platform, said support material removal station applies a solvent that dissolves said second material without affecting said first material to leave said 3-D structure made of only said first material.

6. A three-dimensional (3-D) printer comprising:
an intermediate transfer belt (ITB);
a first photoreceptor positioned to electrostatically transfer a first material to said ITB;
a second photoreceptor positioned to electrostatically transfer a second material to a location of said ITB where said first material is located on said ITB, said second material dissolves in solvents that do not affect said first material;

a platen moving relative to said ITB;

a sheet feeder positioned to feed sheets of media to said platen, said platen moves toward said ITB to have a sheet of said media positioned on said platen repeatedly contact said ITB, said ITB electrostatically transfers a layer of said first material and said second material to said sheet each time said platen contacts said sheet with said ITB to successively form layers of said first material and said second material on said sheet, said layer of said first material and said second material is on a discrete area of said ITB and is in a pattern;

a heater adjacent said platen, said platen moves to said heater after each time said ITB transfers each of said layers to said sheet to independently heat each of said layers and successively join each said layer to said sheet and to any previously transferred ones of said layers on said platen;

a rinsing station positioned to receive, from said platen, said sheet having thereon said layers, said rinsing station applies a liquid to dissolve said sheet and leave a freestanding stack of said layers;

a platform positioned to receive, from said rinsing station, said freestanding stack to successively form a 3-D structure of freestanding stacks of said layers; and a bonding station positioned to apply light and/or heat to said 3-D structure to bond said freestanding stacks to one another on said platform.

7. The 3-D printer according to claim 6, said liquid only dissolves said sheet, and does not affect said first material or said second material.

8. The 3-D printer according to claim 6, said rinsing station comprises a mesh belt and jets positioned to spray said liquid through said mesh belt.

9. The 3-D printer according to claim 6, said bonding station applies said light and/or said heat after each time said rinsing station transfers each of said freestanding stacks to said platform to independently bond each said freestanding stack to any previously transferred ones of said freestanding stacks of said 3-D structure on said platform.

10. The 3-D printer according to claim 6, further comprising a support material removal station positioned to receive said 3-D structure from said platform, said support material removal station applies a solvent that dissolves said second material without affecting said first material to leave said 3-D structure made of only said first material.

* * * * *